US012454203B2

(12) United States Patent
Munoz Perez et al.

(10) Patent No.: US 12,454,203 B2
(45) Date of Patent: Oct. 28, 2025

(54) METHOD FOR THE AUTOMATIC ADJUSTMENT OF A COCKPIT INSIDE A ROAD VEHICLE AND RELATIVE ROAD VEHICLE

(71) Applicant: FERRARI S.p.A., Modena (IT)

(72) Inventors: Juan David Munoz Perez, Modena (IT); Martino Cavanna, Modena (IT); Marco Guglielmo Ribigini, Modena (IT); Mihaela Neagu Chivu, Modena (IT)

(73) Assignee: FERRARI S.P.A., Modena (IT)

( * ) Notice: Subject to any disclaimer, the term of this patent is extended or adjusted under 35 U.S.C. 154(b) by 510 days.

(21) Appl. No.: 17/412,567

(22) Filed: Aug. 26, 2021

(65) Prior Publication Data

US 2022/0063448 A1 Mar. 3, 2022

(30) Foreign Application Priority Data

Aug. 31, 2020 (IT) .......................... 102020000020728

(51) Int. Cl.
*B60N 2/06* (2006.01)
*A61B 5/107* (2006.01)
(Continued)

(52) U.S. Cl.
CPC ............ *B60N 2/067* (2013.01); *A61B 5/1079* (2013.01); *B60N 2/0022* (2023.08);
(Continued)

(58) Field of Classification Search
CPC .................................................. B60N 2/0244
See application file for complete search history.

(56) References Cited

U.S. PATENT DOCUMENTS

| 4,846,529 A | 7/1989 | Tulley |
| 8,818,647 B2 * | 8/2014 | Breed .................. B60N 2/0025 701/538 |

(Continued)

FOREIGN PATENT DOCUMENTS

| CN | 113602222 B * | 8/2023 |
| DE | 10237805 A1 | 2/2004 |

(Continued)

OTHER PUBLICATIONS

Google Machine Translation of International Patent Pub. No. WO2013006639A1 to Horseman that was filed in 2012.*

(Continued)

*Primary Examiner* — Jean Paul Cass
(74) *Attorney, Agent, or Firm* — CANTOR COLBURN LLP (57) ABSTRACT

A method for the automatic adjustment of a cockpit inside a road vehicle comprising the steps of determining anthropometric data of a driver; processing an ergonomic position of a model of the driver sitting on board the road vehicle; processing an optimal configuration of the cockpit; operating a plurality of actuator systems so as to cause the cockpit to reach the optimal configuration; wherein the ergonomic position of the model is processed in association with a minimum ground visibility; a minimum visibility of a control panel; and at least one first comfort angle of a body joint of the driver.

17 Claims, 8 Drawing Sheets

(51) Int. Cl.
*B60N 2/00* (2006.01)
*B60N 2/02* (2006.01)
*B60N 2/16* (2006.01)
*B60N 2/20* (2006.01)
*B60N 2/66* (2006.01)
*B60R 1/07* (2006.01)
*B60R 11/00* (2006.01)
*B60R 11/04* (2006.01)
*B62D 1/187* (2006.01)

(52) U.S. Cl.
CPC ......... *B60N 2/0228* (2013.01); *B60N 2/0233* (2023.08); *B60N 2/0252* (2013.01); *B60N 2/0273* (2023.08); *B60N 2/16* (2013.01); *B60N 2/1635* (2013.01); *B60N 2/20* (2013.01); *B60R 1/07* (2013.01); *B60R 11/04* (2013.01); *B62D 1/187* (2013.01); *B60N 2/0256* (2023.08); *B60N 2/66* (2013.01); *B60N 2210/24* (2023.08); *B60R 2011/0022* (2013.01)

(56) References Cited

U.S. PATENT DOCUMENTS

| | | | |
|---|---|---|---|
| 11,351,892 B1* | 6/2022 | Roy | G05D 1/43 |
| 2005/0046584 A1* | 3/2005 | Breed | B60N 2/02246 |
| | | | 340/13.31 |
| 2006/0208169 A1* | 9/2006 | Breed | G01S 15/88 |
| | | | 250/221 |
| 2008/0216567 A1* | 9/2008 | Breed | B60R 21/013 |
| | | | 73/146.5 |
| 2008/0236275 A1* | 10/2008 | Breed | B60R 21/015 |
| | | | 73/290 V |
| 2008/0276191 A1* | 11/2008 | Breed | B60N 2/0278 |
| | | | 715/764 |
| 2012/0028680 A1* | 2/2012 | Breed | G01S 15/42 |
| | | | 455/556.1 |
| 2012/0089299 A1* | 4/2012 | Breed | B60R 21/013 |
| | | | 701/1 |
| 2017/0197523 A1* | 7/2017 | Magaña | B60K 35/28 |
| 2021/0039522 A1* | 2/2021 | Bove | B60N 2/0278 |
| 2023/0174006 A1* | 6/2023 | Ostrowski | B62D 1/187 |
| | | | 701/49 |

FOREIGN PATENT DOCUMENTS

| | | | | |
|---|---|---|---|---|
| DE | 102009040995 A1 | | 4/2010 | |
| DE | 102013212765 A1 | | 12/2014 | |
| DE | 102013223079 A1 | * | 5/2015 | ........... B60N 2/0244 |
| EP | 0424783 A1 | | 5/1991 | |
| EP | 1533190 A1 | | 5/2005 | |
| JP | 2020185378 A | * | 11/2020 | ............. A61B 5/024 |
| RU | 2560340 C2 | * | 8/2015 | ........... A63F 13/213 |
| RU | 2678459 C2 | * | 1/2019 | ............. B60K 35/00 |
| WO | 2013006639 A1 | | 1/2013 | |

OTHER PUBLICATIONS

Google Machine Translation of European Patent Application Pub. No. EP1533190B1 to Tomonori that was filed in 2004.*
Google Machine Translation of German Patent Pub. No. DE102013212765A1 to Huber that was filed in 2013.*
Search Report for Italian Application No. 102020000020728 completed May 18, 2021, 10 pages.

* cited by examiner

METHOD FOR THE AUTOMATIC ADJUSTMENT OF A COCKPIT INSIDE A ROAD VEHICLE AND RELATIVE ROAD VEHICLE

CROSS-REFERENCE TO RELATED APPLICATIONS

This patent application claims priority from Italian patent application no. 102020000020728 filed on Aug. 31, 2020, the entire disclosure of which is incorporated herein by reference.

TECHNICAL FIELD

The invention relates to a method for the automatic adjustment of a cockpit inside a road vehicle and to a relative road vehicle.

PRIOR ART

A road vehicle is usually driven by more than a driver both within the same family and within a group of friends, especially in case the vehicle is owned by a rental company (for example, high-performance vehicles, such as racing cars, expressly rented to make some laps on a track or to race). In these and other cases, the setting of all those parameters of the vehicle that change depending on the user becomes particularly complicated. In particular, every time a driver who is different from the previous one gets on the vehicle, a plurality of manual or half-automatic adjustments have to be made in order to make the cockpit (namely, the vehicle driving position) comfortable for each driver. These operations often require a large amount of time and, in many cases, the driver is not autonomously capable of easily finding a position of the seat that is comfortable or, anyway, correct to race on a track.

Therefore, in an entirely manual scenario, each driver necessarily has to manually set or re-set all the elements of the vehicle subjected to a specific preference of his/hers and/or to a personal anthropometric configuration of his/hers.

Some known systems have tried to solve these problems by detecting the height of the driver (or by entering it through a suitable interface), so as to calculate a plausible comfort position of driver and move the seat on the driver's side in an automatic manner.

Furthermore, depending on the driving mission (motorway, track, etc.), a same driver could change the plausible comfort position and, hence, be forced to carry out different adjustments despite being the only user of a road vehicle.

However, these systems turned out to be fairly superficial, as the measure of the sole height does not necessarily indicate a knowledge of the anthropometric features of the driver, since two drivers having the same height could have a different length of the torso or of the legs, could have a different length of the neck, have a back bent to a smaller or larger extent, have shorter or longer arms, etc. Therefore, based on the sole height, managing to estimate a correct position of the driver's seat becomes absolutely uncertain.

Furthermore, each user could have a different body features, which could affect air conditioning comfort conditions and/or the perception of sounds inside the road vehicle.

DESCRIPTION OF THE INVENTION

The object of the invention is to provide a method for the automatic adjustment of a cockpit inside a road vehicle and a relative road vehicle, which are at least partially free from the drawbacks described above and, at the same time, are simple and economic to be carried out and manufactured.

According to the invention there are provided a method for the automatic adjustment of a cockpit inside a road vehicle and a relative road vehicle according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
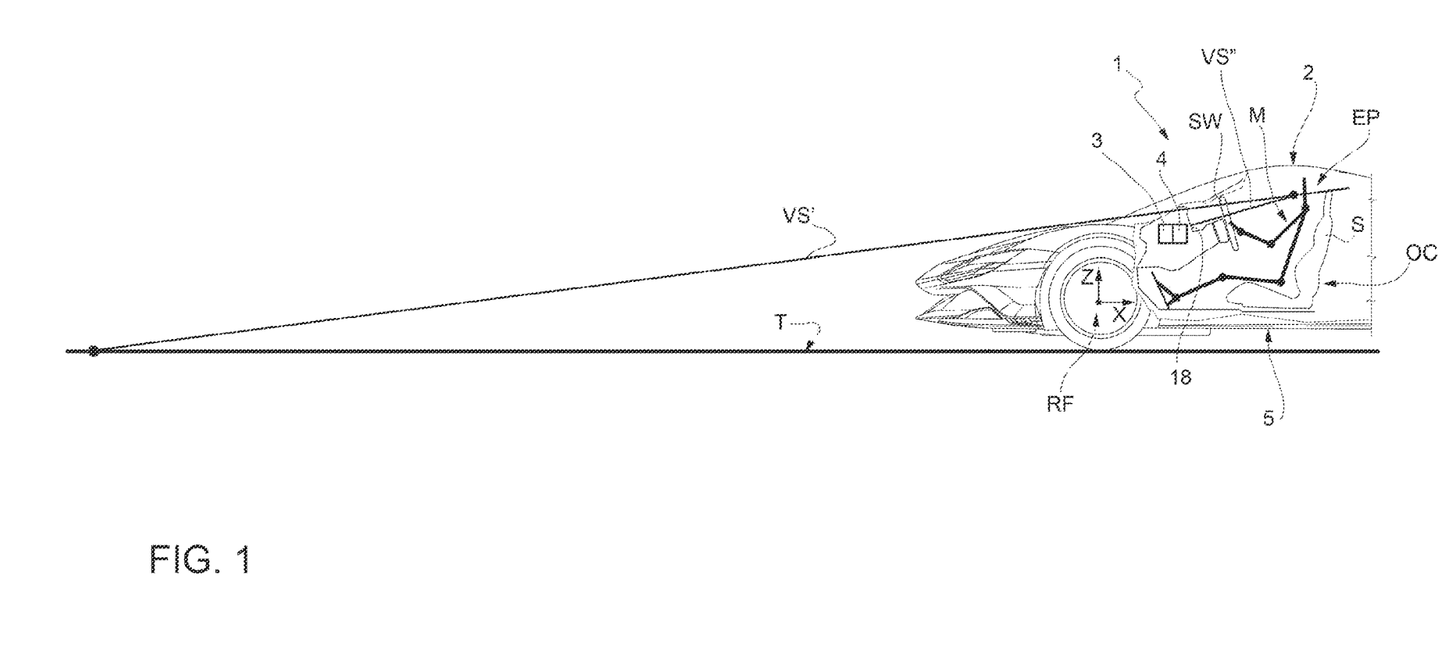
FIG. 1 is a schematic lateral section view of a road vehicle driven by a driver according to the invention.

In FIG. 1, number 1 indicates, as a whole, a road vehicle driven by a driver DR and provided with two front wheels and with two rear wheels (in particular, drive wheels). The vehicle 1 is provided with a passenger compartment 2, which is designed to accommodate the driver DR and possible passengers.

The road vehicle 1 comprises a storing unit 3, which is configured to store anthropometric data of at least one driver DR (in particular, of a plurality of different drivers DR). The term "anthropometric data" identifies all possible measures concerning the body of a driver DR, such as, for example, length and/or the thickness of the limbs, height, distribution of the mass, position of body joints, etc.

Advantageously, the vehicle 1 further comprises a processing unit 4, which is configured to process (or receive, in case there is an external unit carrying out the processing), based on the anthropometric data, an ergonomic position EP of a model M (in particular a two-dimensional model, more precisely the profile) of the driver DR sitting on board the road vehicle 1.

According to the non-limiting embodiment of FIG. 1, the processing unit 4 is further configured to process (or receive, in case there is an external unit carrying out the processing), based on the ergonomic position EP of the model M, an optimal configuration OC of a cockpit 5 so that, in use, the driver DR substantially is in the ergonomic position EP.

Advantageously, the vehicle 1 further comprises a plurality of actuator systems, which are configured to adjust a plurality of movable elements of the cockpit 5 so as to reach the optimal configuration OC. In particular, the movable elements comprise at least one driver's seat S, a steering wheel SW (and a plurality of rear-view mirrors RM). According to some non-limiting embodiments, the movable elements are each moved by one or more electric motors, in particular brushless or stepper motors.

Figure 2:
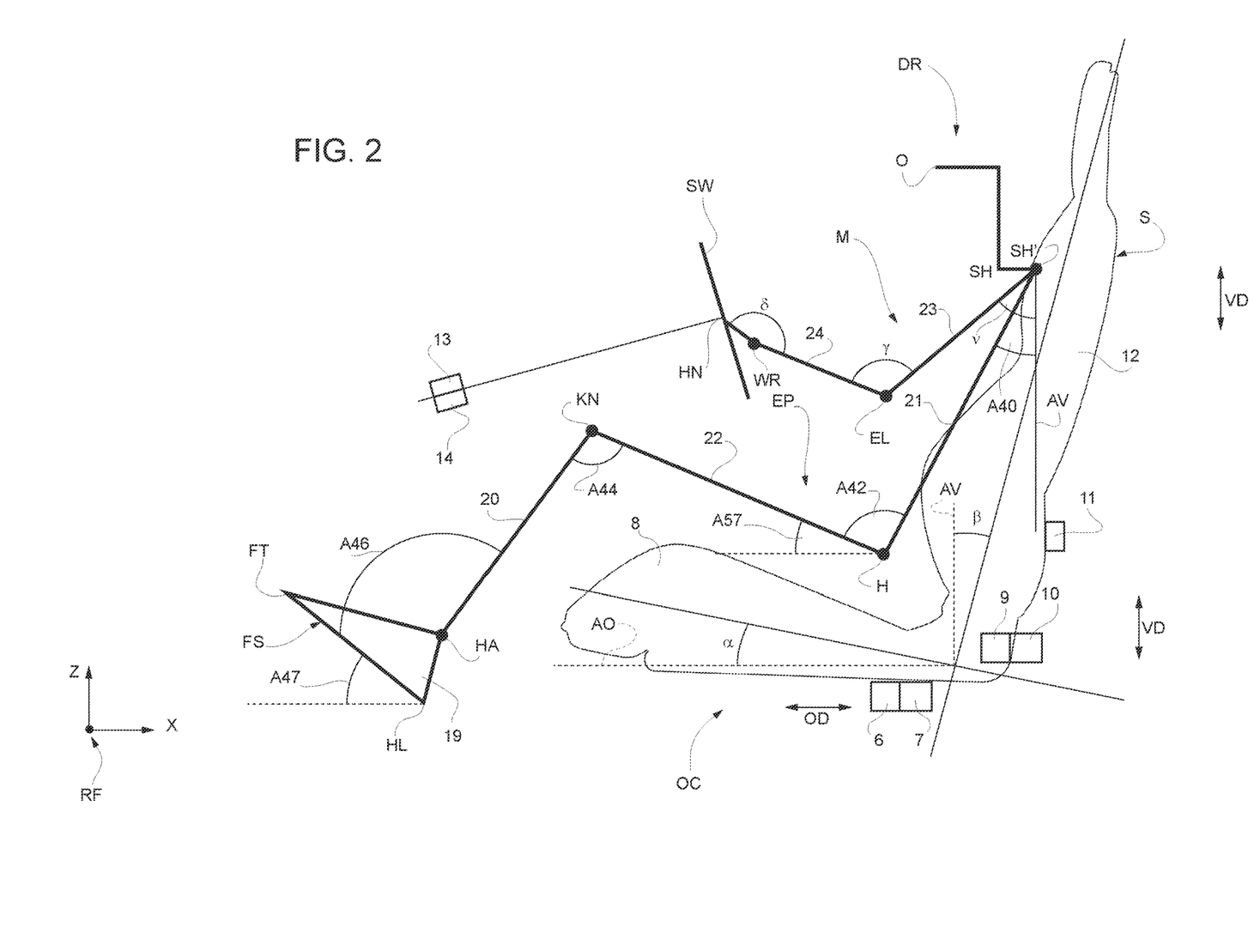
FIG. 2 shows a first schematic lateral view of a two-dimensional model of a driver sitting on a seat of the road vehicle.

In the non-limiting embodiment of FIG. 2, the vehicle 1 comprises the driver's seat and an actuator system 6, in particular a linear one, which is configured to adjust a translation of the driver's seat S along a direction OD, which is parallel to a longitudinal axis of the vehicle 1 (and substantially horizontal). In other words, the actuator system 6 adjusts the distance between pedals and the seat S. Furthermore, the vehicle 1 comprises an actuator system 7, in particular a rotary one, which is configured to adjust the height of a seat cushion 8 of the driver's seat S, thus adjusting a movement along a direction VD, which is substantially perpendicular to the direction OD (and, in particular, substantially vertical). In addition, the vehicle 1 comprises an actuator system 9, which is configured to adjust the tilt (namely, an angle α relative to a horizontal axis—FIG. 2) of the seat cushion 8 of the driver's seat S. In particular, the vehicle 1 comprises at least two more actuator systems 10 and 11, which are configured to adjust the tilt (namely, an angle β relative to a vertical axis—FIGS. 2 and 3) and the thickness (in a lumbar region), respectively, of a backrest 12 of the driver's seat S.

Therefore, in the non-limiting embodiments of FIGS. 1 and 2, the vehicle 1 comprises the steering wheel SW, an actuator system 13 and/or an actuator system 14, which are configured to vertically and horizontally adjust, respectively, the position of the steering wheel SW inside the road vehicle 1, namely inside the passenger compartment 2.

Alternatively or in addition, the vehicle 1 comprises further actuator systems to adjust the position and/or the orientation of the rear-view mirrors RM depending on the anthropometric data of the driver DR.

Figure 8:
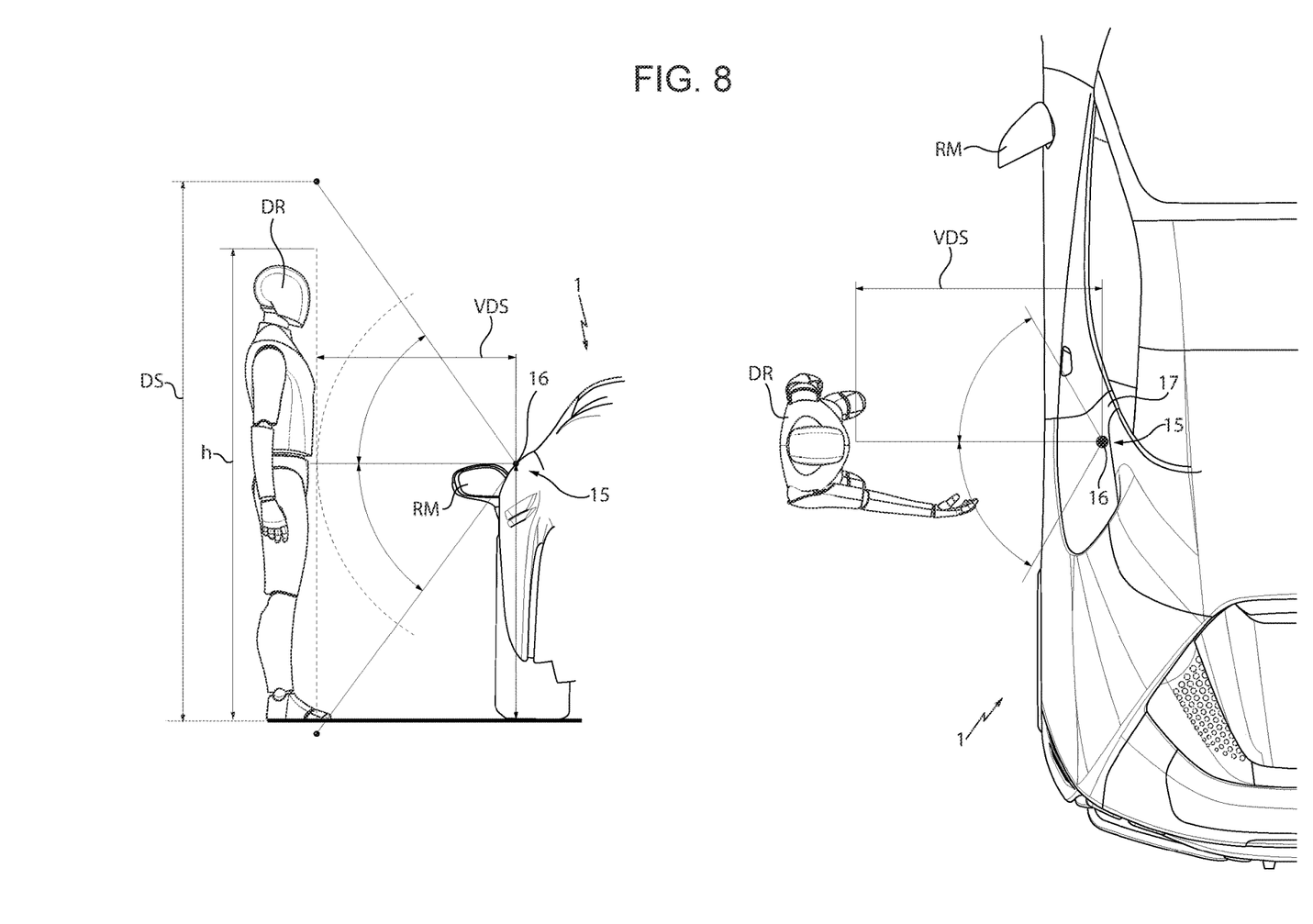
FIGS. 8 and 9 are a rear view and a perspective view, respectively, of a possible configuration of a sensor device on board the vehicle.
Figure 9:
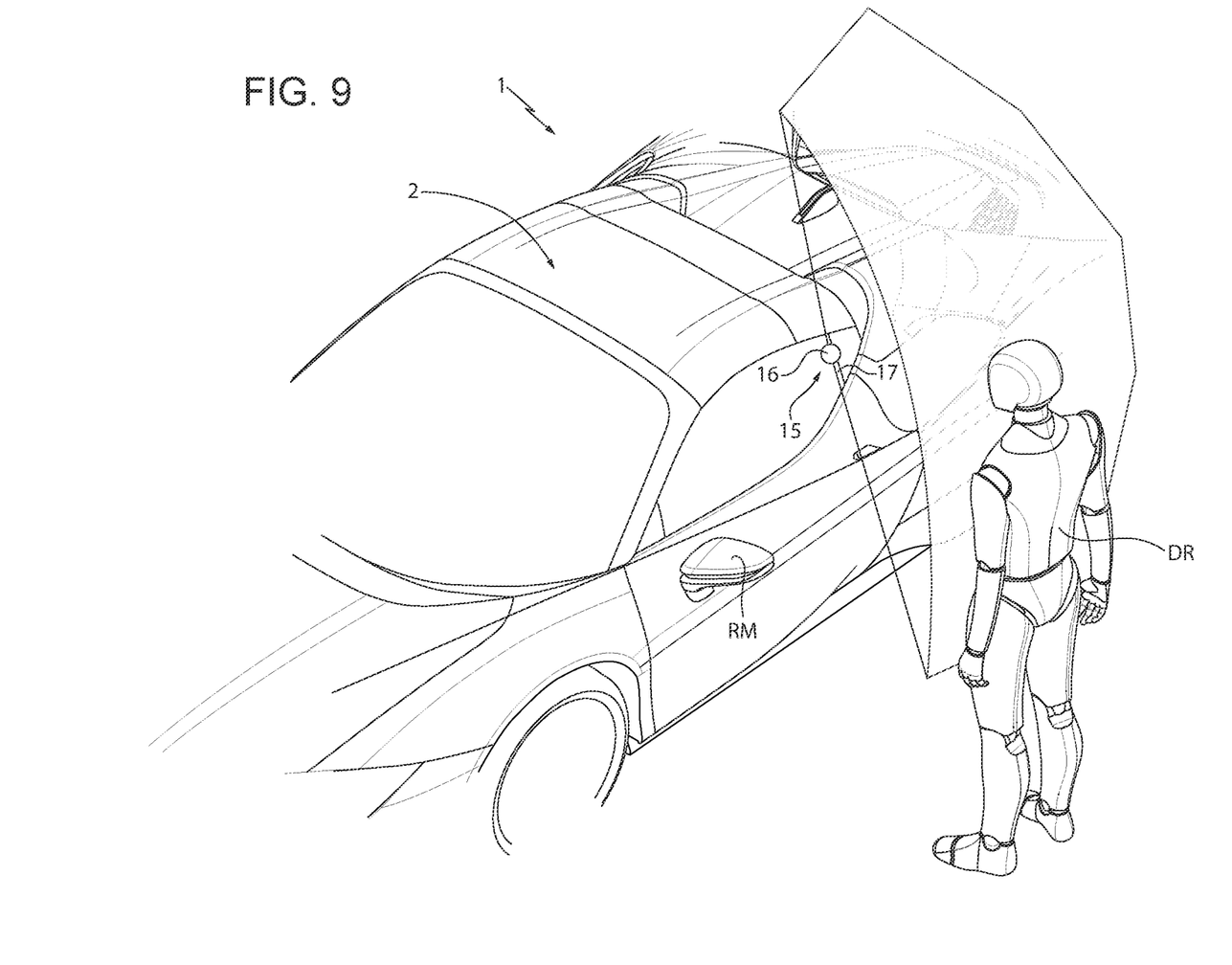

In some non-limiting cases, like the ones shown in FIGS. 8 and 9, the vehicle 1 comprises a sensor device 15, in particular an (optical, infrared/thermographic or ultrasound) camera 16, which is mounted towards the outside of the road vehicle 1 (in detail, on the body), more precisely on a pillar 17 of the road vehicle 1, in particular on the pillar B on the driver's side of the road vehicle 1. The sensor device 15 is configured to detect anthropometric data of a driver DR approaching the road vehicle 1.

Advantageously, though not necessarily, the vehicle 1 also comprises a sensor device (for example, with features that are similar to the ones of the device 15—video camera and/or thermographic camera), which is at least partially mounted inside the vehicle 1, in particular in the area of an inner roof lamp of the passenger compartment 2. Alternatively or in addition, the sensor device is at least partially mounted behind the steering wheel, in particular in the area of the dashboard.

The further sensor device is configured to detect anthropometric data of a driver DR sitting inside the road vehicle 1. More precisely, said further sensor device is configured to detect the position of the eyes of the driver DR, for example in order to provide the processing unit 4 with a feedback concerning the correctness of the optimal configuration OC (in particular, so that it can carry out a feedback control). In some non-limiting cases, the storing unit 3 is configured to record, only once, one or more images of a driver DR so as to define anthropometric data of the latter.

Advantageously, though not necessarily, the processing unit 4 is configured to process, based on the recorded images and/or on additional anthropometric data entered by the driver DR by means of an interface device (for example, a pc, a smartphone, a tablet or an inner control panel of the vehicle), the model M of the driver calculating a measure of the length of his/her limbs. In particular, as mentioned above, the processing unit 4 is configured to process, based on the model M, the ergonomic position EP of the diver DR sitting on board the road vehicle 1.

Advantageously, though not necessarily, the vehicle 1 comprises a data base (for example stored inside the storing unit 3), which is connected to the processing unit 4 and is configured to contain the ergonomic position EP of the driver and the respective model M, in particular associating them with identifying data and with a set of preferences that are specific for that driver DR (preferably, postural, air conditioning as well as multimedia preferences).

In some non-limiting cases, the vehicle 1 further comprises a detection device, which is configured to detect a possible driver DR approaching DR the vehicle and wanting to access the vehicle by searching for identifying data close to the road vehicle. I particular, the detection device is a control unit, which is configured to detect the approaching of a driver's key and/or by means of proximity control devices integrated in smart devices (for example, by means of RFID technology, Bluetooth® or NFC, UBW, BLE, etc.).

Advantageously, though not necessarily, the sensor device 15 is configured to act as detection device and/or record images of the driver DR, in particular the camera 16 is arranged on the side of the vehicle so as to frame the outside of the vehicle 1 on the driver's side. In particular, said further sensor device is arranged so as to frame the inside of the passenger compartment 2.

In some non-limiting cases, the vehicle 1 comprises one or more further sensor devices, which are arranged inside the passenger compartment 2 and are configured to monitor at least one parameter concerning a current condition of the driver DR (position, tiredness, mood, etc.).

Alternatively or in addition, the vehicle further comprises one or more dedicated sensors (outer cameras, radars, GPS, etc.), which are configured to monitor a current condition of the vehicle 1 (path on which it is driving, driving mode, etc.).

According to some preferred non-limiting embodiments, the vehicle 1 further comprises an air conditioning system and/or an infotainment system, which are configured to adjust the air conditioning and at least the sound inside the passenger compartment 2.

According to a non-limiting aspect of the invention, there is provided a method for the automatic adjustment of the cockpit 5 of a road vehicle 1 driven by a driver DR.

The method comprises a step of determining anthropometric data of the driver DR. In some non-limiting cases, the anthropometric data is detected by the vehicle 1 (for example, through the sensor device 15 or the further sensor device). Alternatively or in addition, the anthropometric data of the driver is manually entered through the interface device (for example, a smartphone).

The method further comprises a step of processing, based on the anthropometric data, the ergonomic position EP of the model M (in particular, though not exclusively, a two-dimensional model) of the driver DR sitting on board the road vehicle 1. In other words, the method entails calculating, depending on the body measures of the driver DR, a schematic model M, for example of the type shown in FIG. 3, which estimates the positions of different joints (for example, articulation joints or in the area of organs of interest, such as eyes O and/or ears HE) and, consequently, the length of the different body parts, for example the limbs.

The method advantageously entails processing, based on the ergonomic position EP, an optimal configuration OC of the cockpit 5 (comprising, for example, the seat S, the steering wheel SW and the rear-view mirrors RM). In other words, depending on the ergonomic position EP processed by the processing unit 3, the position of the movable (and motor-driven) elements of the cockpit 5 is processed so that the sitting driver DR is in the ergonomic position EP.

Therefore, according to some preferred non-limiting embodiments, the method comprises the step of operating the actuator systems 6, 7, 9-11, 13 and 14 based on the processed optimal configuration OC so as to adjust the plurality of movable elements of the cockpit 5 and allow the cockpit 5 to reach the optimal configuration.

According to the non-limiting embodiment of FIG. 11, the ergonomic position EP of the model M and, hence, the optimal configuration OC of the cockpit 5 are processed by associating at least one respective predefined value (or range) (which, for example, is experimentally calculated) with:

- a minimum visibility VS' of the ground T by the driver DR depending on the architecture of the road vehicle 1 (in particular, in the ergonomic position, the driver DR is assumed to need to see at least starting from 2 metres from the front side of the vehicle 1, in particular starting from 10 metres);
- a minimum visibility VS" of a control panel 18 fitted on board a dashboard of the road vehicle 1 (in particular, in the ergonomic position EP, the driver DR is assumed to need to see at least 80% of the control panel 18, more in particular at least 95% of the control panel 18);
- at least one comfort angle A46 of a body joint of the driver DR (namely, an angle of an articulation of the driver's body, which is processed by means of the model M).

In particular, the term "architecture of the vehicle" identifies the mechanical structure of the vehicle, such as for the example the height of the pedals from the inner floor of the vehicle, the model, the dimension of the wheels, the height of the control panel 18, the position and the dimension of the windshield, etc.

Advantageously, though not necessarily, the comfort angle A46 is the angle of the ankle HA of the driver (as shown in FIG. 2) in a driving position. In other words, the angle A46 is the angle formed between the sole (or the back) of a foot 19 resting on a pedal of the road vehicle 1 and the leg 20 (in detail, the tibia) of the driver. In particular, the comfort angle A46 ranges from 80° to 170° (more in particular, the angle A46 changes as the model of the road vehicle 1 changes). In this way, by ensuring an angle of the ankle HA with the foot F that allows the driver DR to sit in a substantially comfortable position with a small muscle stress, driving the vehicle definitely becomes more enjoyable.

Advantageously, though not necessarily, the optimal configuration OC of the cockpit 5 is processed by also associating a respective predefined value with a comfort angle A42. According to the non-limiting embodiment of FIG. 2, the comfort angle A42 is the angle of the hip articulation H of the driver DR sitting on the driver's seat S of the road vehicle 1. In particular, the angle A42 is the angle formed between the torso 21 and the thigh 22 (in detail, the femur) of the driver DR.

Advantageously, though not necessarily, the optimal configuration OC of the cockpit 5 is processed by also associating a respective predefined value with a comfort angle γ. According to the non-limiting embodiment of FIG. 2, the comfort angle γ is the angle of the elbow articulation EL of the driver DR sitting on the driver's seat S of the road vehicle 1. In particular, the angle γ is the angle formed between the arm 23 (in particular, the humerus) and the forearm 24 of the driver DR.

According to some preferred, though non-limiting embodiments, the optimal configuration takes into account vehicle variables, such as for example the racing or road attitude, the open or closed hardtop, and/or external variables, such as for example scarce visibility or weather conditions.

In particular, for example, in case of a racing attitude, the minimum visibility VS' of the ground T is increased, as a track normally is emptier than a road open to traffic and being able to see ahead of the vehicle to a greater extent turns out to be useful, or the tilt of the backrest of the seat S is reduced, etc. Vice versa, under adverse weather conditions (rain or fog), the minimum visibility VS' of the ground T is reduced, etc.

Figure 3:
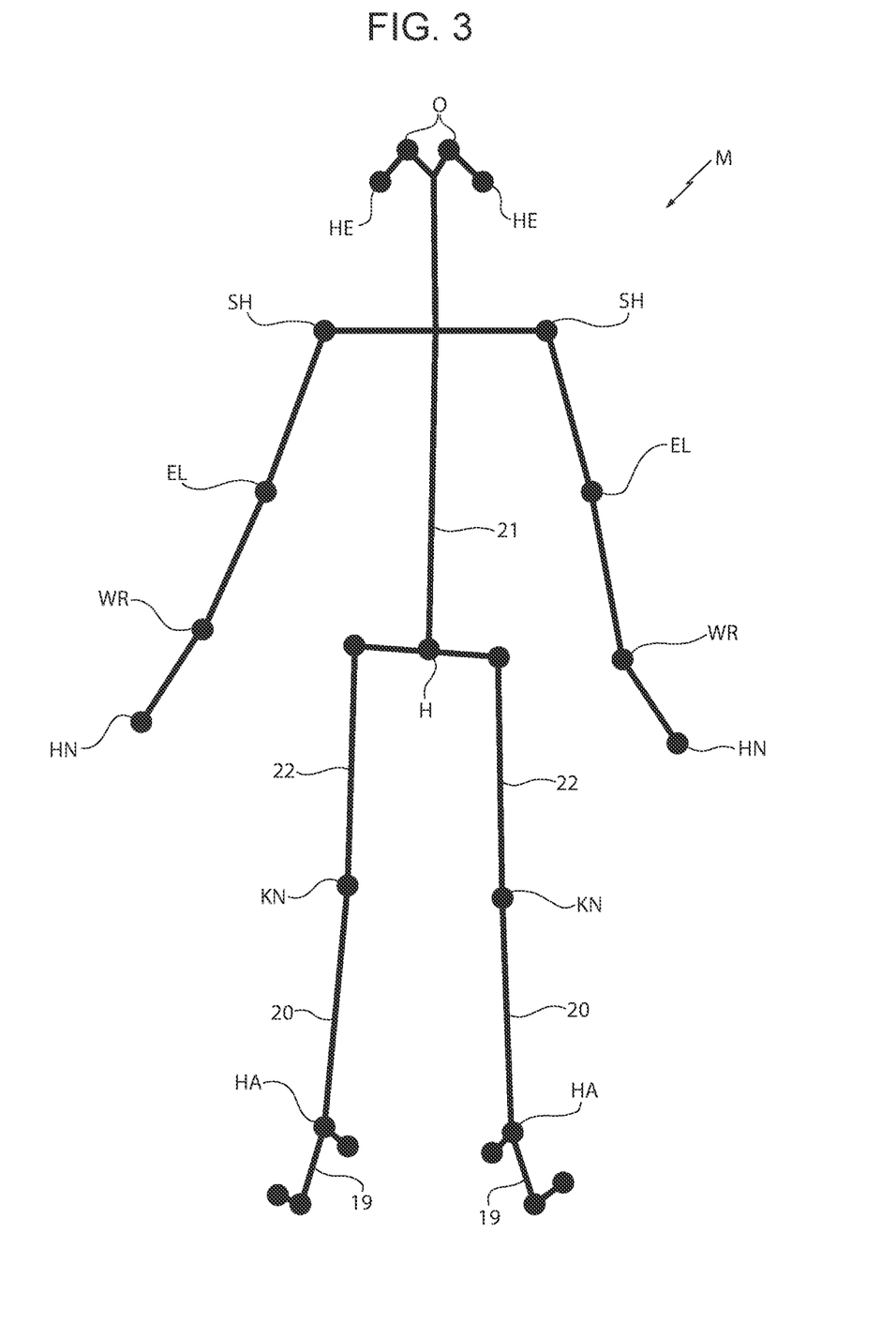
FIG. 3 shows a possible model of a driver in an erect position.

Advantageously, though not necessarily, and according to the non-limiting embodiments of FIGS. 2 and 3, the anthropometric data of the driver DR comprises the position of a plurality of joints HA, KN, H, SH, EL, WR, HN, O, HE of the driver DR, through which at least the height h and the length of the limbs of the driver DR (as well as the position of the eyes O, of the ears HE, of the hands HN, etc.) are processed. In particular, the position of the joints of the driver DR is used to define, starting from the comfort angle A46, the positions of said joints HA, KN, H, SH, EL, WR, HN, O, HE in the ergonomic position EP of the model M.

Advantageously, though not necessarily, the position of the plurality of joints HA, KN, H, SH, EL, WR, HN, O, HE of the driver DR is used to process the ergonomic position EP of the model M, calculating (in particular, using trigonometry) remaining angles A44, A57, A40, υ, etc. of the model M in the ergonomic position EP accordingly. In particular, the angles A46, A42, γ (and δ, namely the angle of the wrist, comprised between the forearm 24 and the hand HN) are used as inputs. More in particular, the trigonometry calculations made to place the model M in the ergonomic position EP are carried out using a two-dimensional reference system RF (with a horizontal axis x and a vertical axis z) located at the centre of the front wheel of the vehicle 1 (as shown in the non-limiting embodiment of FIG. 1).

Advantageously, though not necessarily, once the ergonomic position EP of the model M has been processed, it is corrected taking into consideration a postural variation of a cervical articulation (for example, the moving aside or the lowering of a neck of the driver DR from a relaxed driving position) and/or a postural variation of a shoulder articulation (for example, the forward projection thereof due to a postural bending of the back).

These variations, in particular, are determined in an experimental manner or using/developing suitable statistical studies.

In particular, once the ergonomic position EP has been calculated, the processing unit 3 processes the optimal configuration OP to be reached by the cockpit 5 in order to allow the driver DR to assume, in use, while driving, the ergonomic position EP.

According to some preferred, though non-limiting embodiments, like the ones shown in FIGS. 4a-4c and 5, the method also comprises a control step, which involves checking whether the optimal configuration OC lies within a work space WS of said plurality of movable elements S, SW, RM (in particular, of the seat S) of the cockpit 5, thus determining possible portions 25 lying on the outside of the work space WS. In particular, in case of portions 25 lying on the outside of the work space WS (FIG. 5—namely, in case the ergonomics of the driver DR does not allow the optimal configuration to be exactly reached because of mechanical limits of the actuator system and/or of the movable elements), the method also comprises the step of calculating an obtainable position 26, in particular processed based on the position of a point of the joint of the hip (H being the one according to the ergonomic position EP and H' being the obtainable one) of the driver DR, and the consequent step of changing the ergonomic position EP of the model M. More precisely, the obtainable position 26 is calculated keeping the position of the joint of a knee KN of the driver DR constant and, hence, changing the angle A44. In this way, the angle A46 of the driver's ankle remains constant, though ensuring a sufficiently comfortable position.

According to the non-limiting embodiment of FIG. 2, said plurality of actuator systems to reach the optimal configuration OC comprises a height, depth and/or tilt adjustment of the seat cushion 8 of the driver's seat S and/or a tilt and thickness adjustment of the backrest 12 of the driver's seat S and/or an adjustment of one or more rear-view mirrors RM of the vehicle 1 and/or a vertical and horizontal adjustment of the steering wheel SW.

Figure 4:
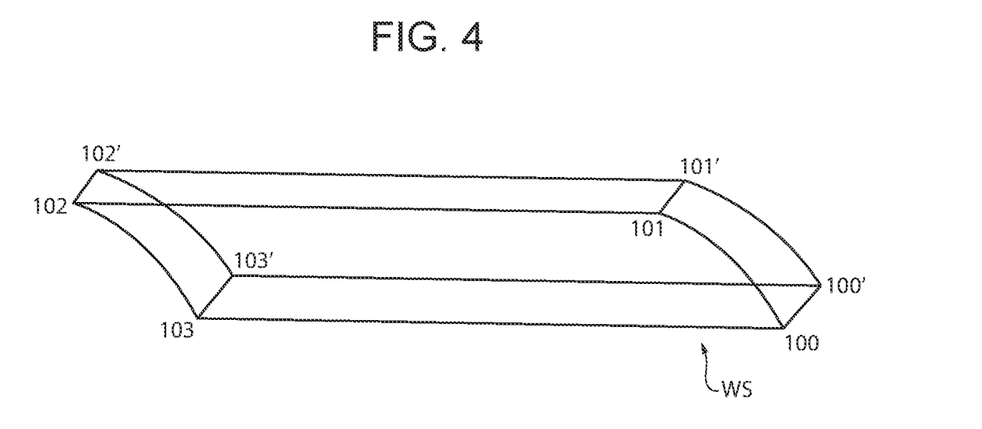
FIG. 4 shows the composition of a possible work space of the seat of FIG. 2.
Figure 5:
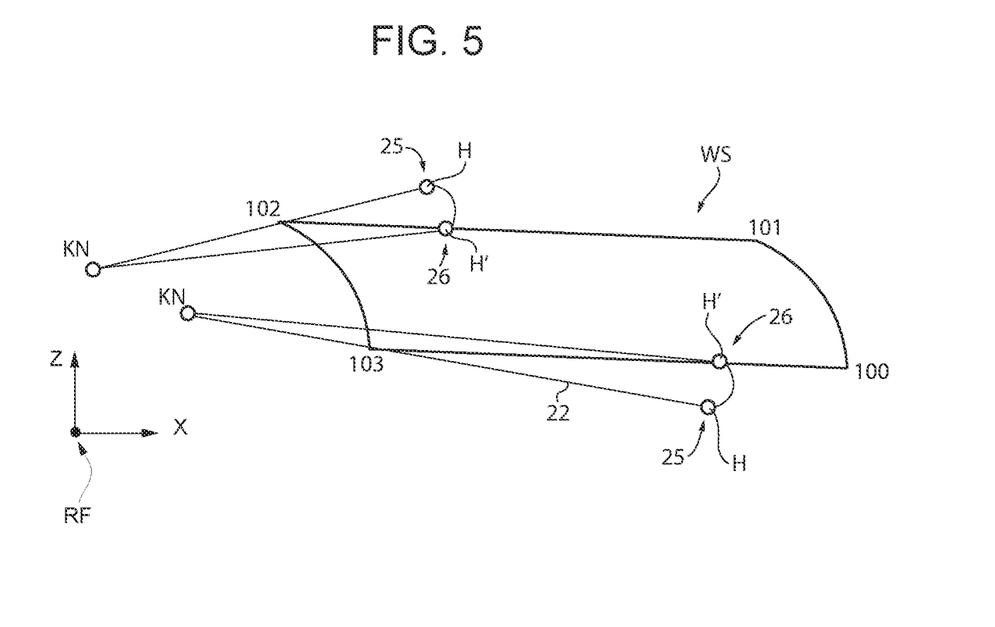
FIG. 5 schematically shows a compensation for a measure on the outside of the work space.

FIG. 4 shows a possible three-dimensional work space WS of the seat cushion 8 of the driver's seat S (which can be horizontally and vertically oriented as well as in its tilt). In particular, the shape of said work space WS changes as the moving mechanisms used for the seat cushion 8 of the driver's seat S change. For example, a linear movement from point 100 to point 103 (just like from point 101 to point 102 and all intermediate segments) corresponds to a sliding of the seat S along the direction OD. Furthermore, a movement along the arc from point 100 to point 101 (just like from point 103 to point 102 and all intermediate segments) corresponds to a lifting of the seat S along the direction VD (and partially also along the direction OD). Finally, the three-dimensional movement in shifting from points 100-103 to points 100', 103' is the result of a change in the tilt of the seat cushion 8.

Advantageously, though not necessarily, in order to obtain a grater seat comfort, the tilt of the seat cushion 8 is set to the maximum value (namely, the maximum of the angle A57) which is compatible with the position of the point of the hip joint H. In particular, by setting the tilt angle A57 of the seat cushion to this value, the position of the seat cushion 8 on the x-z planed is fixed. At this point, the previously calculated hip point H is controlled in order to check whether it actually is within the remaining two-dimensional work space WS and, in case the point H determines a portion 25 on the outside of the work space WS, it is moved back, in the x-z plane, to the point closest to the work space WS. In particular, by keeping the point in which the knee joint KN is located fixed, the point H is moved along an arc of circumference (having, as radius, the length of the thigh 22 of the driver DR).

According to some non-limiting embodiments, the method comprises the further step of detecting the anthropometric data of the driver DR by means of a fixed or movable interface device, in which the driver DR manually enters said required anthropometric data. By way of example, the interface device can be a smartphone (pc or tablet) or a touch-screen of the vehicle 1, on which, by means of an application, the driver DR enters the required anthropometric data, such as height, weight, measure of the limbs, of the foot, etc.

According to some non-limiting embodiments, the driver DR enters/displays/changes his/her anthropometric data by means of a smartphone or tablet app.

According to other (or additional) non-limiting embodiments, the anthropometric data of the driver DR is detected only once by the manufacturer of the road vehicle, for example upon buying it.

Advantageously, though not necessarily, the anthropometric data of the driver DR is detected by means of a scanning device (for example, a three-dimensional laser or a body-scan), more precisely available at the car dealer.

Alternatively or in addition, the method comprises the further step of detecting the anthropometric data of the driver DR by means of at least the sensor device 15, in particular the camera 16 facing the outside of the vehicle, and/or the further sensor device facing the inside.

Advantageously, though not necessarily, the sensor device 15, in particular the camera 16, detects the anthropometric data (taking pictures and processing them by means of the processing unit 3 and of known image processing systems, which are not described any further) of the driver DR approaching the vehicle 1 and, at the same time, processes the optimal configuration.

Advantageously, though not necessarily, the method comprises a getting-in step, during which the actuator devices are controlled so as to cause the cockpit 5 to assume a retracted configuration, in which at least some of the movable elements (in particular, the seat S and the steering wheel SW) of the cockpit 5 make it easier for the driver DR to get in. In other words, as the driver DR approaches the vehicle, the seat S is lowered and moved away from the steering wheel SW and the steering wheel SW is lifted as much as possible. This makes it easier for the driver DR to get in, since he/she has more space available to get on board.

Advantageously, though not necessarily, the method comprises the further step of dynamically adjusting the optimal configuration OC, in particular while driving. For example, the ergonomic configuration OC is adjusted depending on the tiredness of the driver, on his/her mood and on the path on which the vehicle is driving (for example switching from a road open to traffic to a track or vice versa, etc.). In this way, the driver DR continuously is in the ergonomic position EP and not only when he/she gets into the vehicle 1. Furthermore, as the conformation of the path to be covered changes, the ergonomic position associated with it changes as well (for example, when driving on a track, the driver needs to see farther compared to a road open to traffic and, therefore, the vehicle parameters are adjusted to this situation).

In particular, the method comprises the step of cyclically (or continuously) monitoring at least one parameter concerning the current condition of the driver DR (the position, the tiredness, the way in which he/she is sitting) or a current condition of the vehicle (driving mode, path to be covered, etc.). In particular, the parameter concerning the current condition of the driver DR is monitored by one or more further sensor devices arranged inside the passenger compartment 2, whereas the current condition of the vehicle is monitored by one or more dedicated sensors (outer cameras, radars, GPS, etc.).

Advantageously, the method comprises the further step of dynamically re-processing the ergonomic position EP of the driver DR based on at least one parameter concerning the current condition of the driver DR. Following the re-processing of the ergonomic position EP of the driver, the optimal configuration OC of the different actuator systems is re-processed and controlled accordingly.

Figure 6:
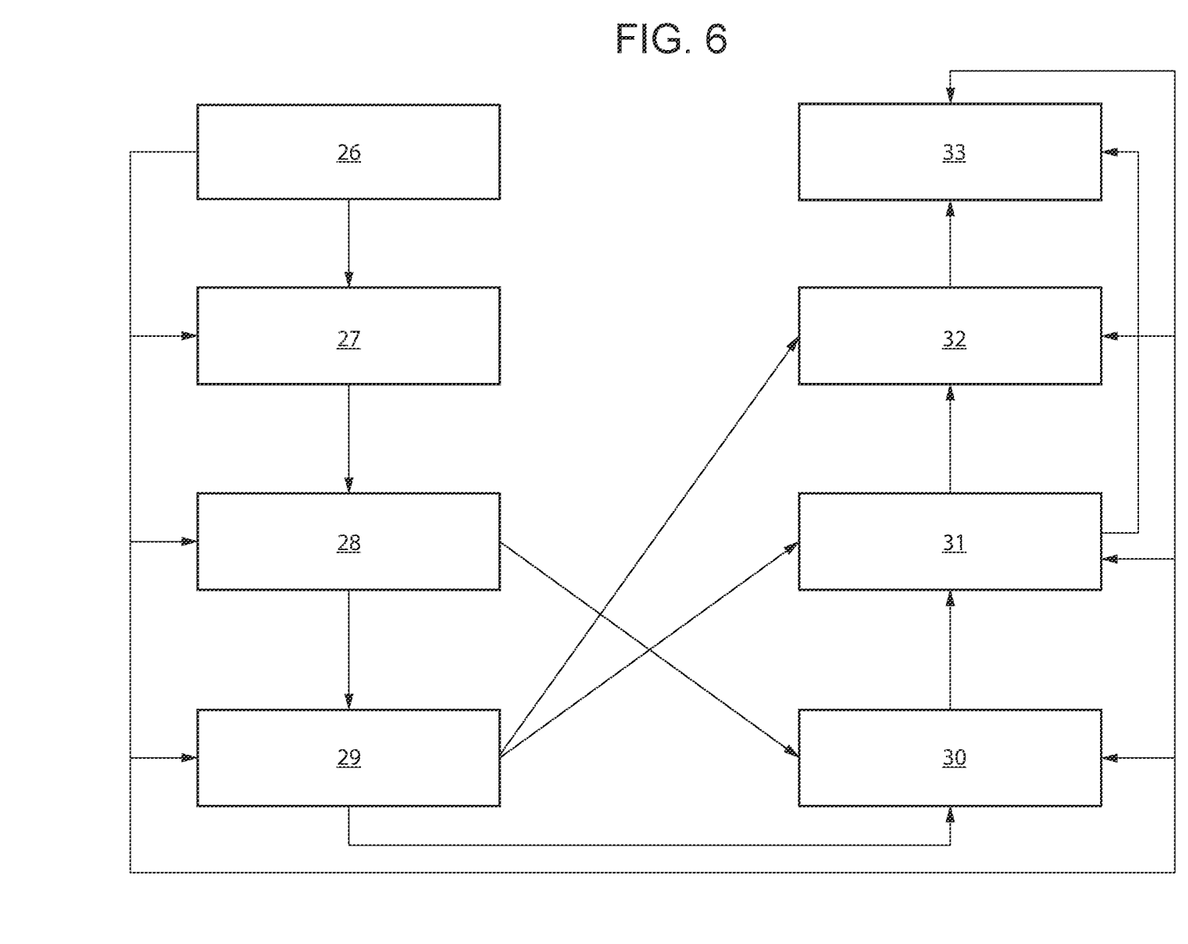
FIG. 6 shows a possible schematic diagram to calculate an ergonomic position of the driver.

The non-limiting embodiment of FIG. 6 shows a schematic diagram for the calculation of the ergonomic position EP of the driver DR according to the method described above.

In particular, in block 26, the measures of the body joints of interest are defined (by having a sensor device 15 capture images and/or by entering the required measures by means of an interface device, such as a smartphone or a touch-screen on the inside of the vehicle 1). In detail, the measures of the body joints of interest comprise segments FT-HL, HL-HA, HA-FT, HA-KN, KN-H, H-SH', SH'-SH, SH-$O_X$, SH-$O_Y$, SH-EL, EL-WR, WR-HN. Obviously, the model M can be simplified by using a smaller number of body joints of interest. Furthermore, in block 26, the comfort inputs are predefined, which, in detail, comprise the angles A46, A42, γ and δ. In addition, block 23 defines the parameters of the vehicle to be taken into account in order to complete the calculation of the ergonomic position EP of the model M. In particular, said parameters comprise the physical measures defined by the model of vehicle 1 used by the driver DR, namely the architecture of the vehicle 1. In detail, said parameters comprise the height of one or more pedals of the vehicle 1 (in particular, the height of the gas pedal), the height of the centre of the front wheel of the vehicle (hence, the origin of the reference system RF), the angle A47 defined between the foot sole and the inner floor of the vehicle, etc.

Therefore, advantageously, though not necessarily, the parameters of the vehicle used for the calculation of the ergonomic position EP change and the model of the road vehicle 1 changes.

Once the inputs of the method have been defined in block 26, the flow switches to block 27, in which the ankle point HA relative to the reference system RF is calculated by means of trigonometry calculations. Once the point HA is known and using as predefined inputs (predefined, for example, by experimental tables or suitable statistical studies) the angles A46 and A47, block 28 calculates the point KN in which the knee joint of the driver DR is located.

Advantageously, though not necessarily, block 29 entails calculating the angle A40, namely the angle defined between the torso 21 of the river DR and the (vertical) direction VD. In particular, the angle A40 is calculated using the inputs provided by block 26 and by block 28.

In particular, once the angle A40 has been calculated, block 30 defines the position of the point H calculating the angle A57 (through the knowledge of the angle A40 and of the angle A42). In particular, the x-z coordinates of the hip point H are defined by the knowledge of the coordinates of the knee point KN, of the length of the thigh of the driver DR and of the angle A57, which was just calculated.

Going on with the definition of the ergonomic position EP, in block 31, the positions of the shoulders SH and of the eyes O are defined. In particular, as pointed out by the arrows of FIG. 6, the data of block 26, of block 29 and of block 30 are needed as inputs in order to complete the processing.

Block 32, on the other hand, calculates the angle υ, namely the angle between the vertical direction VD and the arm 23 of the driver DR. Once, in block 31, the shoulder support point SH' and the actual shoulder point SH have been calculated and knowing the angle γ, the angle υ can be calculated as well in order to allow the driver DR to drive in a fashion that is deemed to be comfortable also for the shoulders and the arms.

Finally, in block 33, the processing of the ergonomic position EP is completed by calculating, as a consequence, the points of the arm 23, of the forearm 24 and of the hand HN of the driver DR.

Once the processing of the ergonomic position EP has been completed, the optimal configuration is calculated using the parameters that were just calculated as limits. In particular, in case the optimal configuration cannot be reached, a reachable position is calculated (changing the optimal configuration as little as possible, for example keeping the knee point constant as described above).

Figure 7:
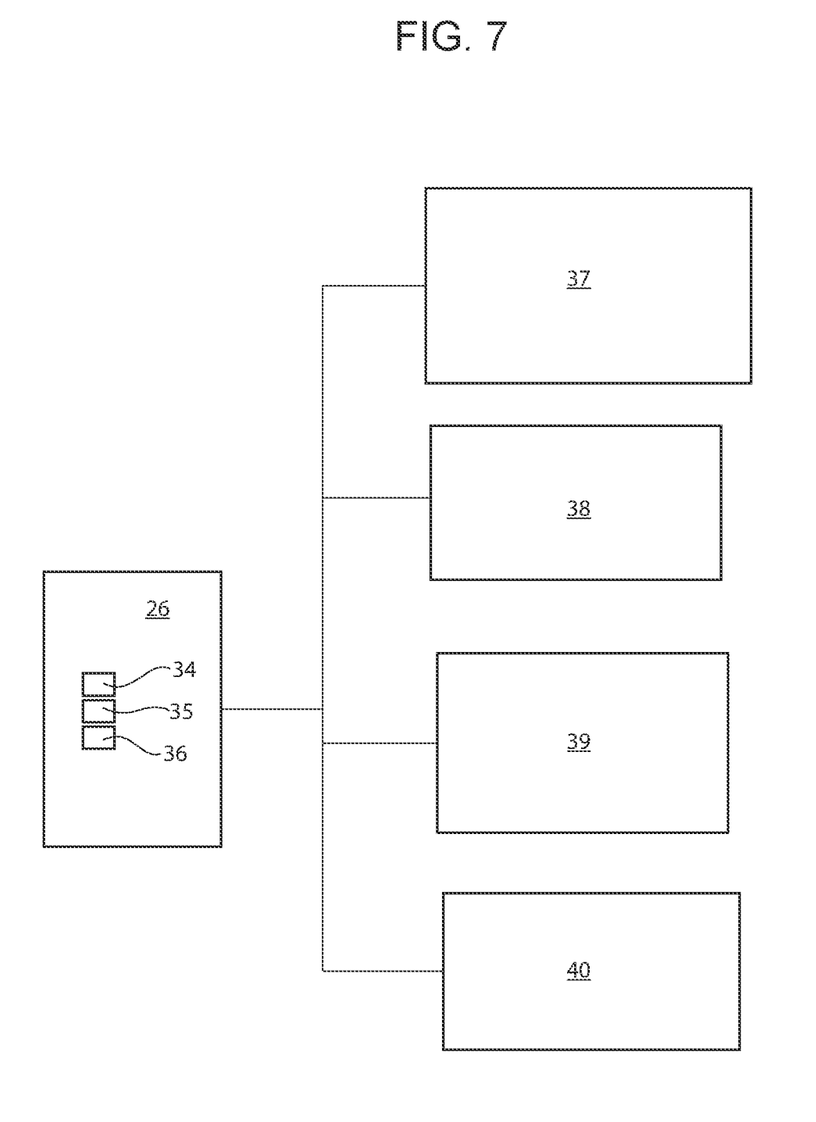
FIG. 7 shows a possible schematic diagram of a method for the automatic adjustment of a cockpit.

The non-limiting embodiment of FIG. 7 shows a possible schematic diagram of a method for the automatic adjustment of a cockpit. In particular, block 26 includes the inputs of the method as described above and is divided into three sub-blocks 34, 35 and 36 defining the body joints of interest, the comfort inputs and the parameters of the vehicle 1, respectively.

Following the definition of these inputs, block 37 calculates the ergonomic position EP according to what described above, namely according to the comfort inputs, the parameters of the vehicle and the length of the limbs; in block 38, mechanical limits and possible limitations set by the work space WS of the movable elements of the cockpit 5 are applied. Finally, taking into account mechanical limits and if necessary, the obtainable ergonomic position (which is different from the standard ergonomic position EP) is calculated and the result obtained so far is translated into instructions to be communicated to the movable elements (namely to the actuators of the seat S, of the steering wheel SW and of the rear-view mirrors RM).

In use, as a driver approaches the road vehicle 1, at first it is necessary to establish whether the driver DR is known or not. If he/she is, his/her preferences are recovered from the data base, if he/she is not, the anthropometric data of the driver is requested or autonomously detected by means of the sensor device 15 and, after having obtained it, the optimal (or obtainable) configuration OC is calculated (according to the steps described above). Preferably, before the driver gets on board the vehicle 1, the steering wheel SW and the seat S are retracted in order to make it easier for him/her to get on board. Once the driver DR getting in has been detected, the actuator systems are operated so as to reach the optimal configuration OC and allow the driver DR to drive the vehicle 1 with a good level of comfort, without wasting any time adjusting the movable elements.

The non-limiting embodiments of FIGS. 8 and 9 show the vehicle 1 provided with the sensor device 15 (with the camera 16) on the pillar 17B on the driver's side. Obviously, what described so far also applies to the adjustment of a passenger's cockpit.

In some non-limiting cases, the sensor device 15 is used to carry out a face recognition of the driver DR so as to define whether he/she is a known driver (whose data is present inside the storing unit 3) or an unknown driver.

In particular, the camera 16 detects the anthropometric data of the driver as long as the height h of the driver DR is lower than the detection space DS. More precisely, the camera 16 detects the anthropometric data of the driver DR when the latter is standing at a predefined distance VDS from the vehicle 1. In some non-limiting cases, the higher the height h of the driver, the greater the distance VDS from the vehicle 1 for the detection of the anthropometric data.

Advantageously, though not necessarily, the camera 16 takes a plurality of different pictures as the driver DR approaches the vehicle 1.

According to some non-limiting embodiments, the method comprises a further step in which the driver DR slightly changes the optimal configuration OC based on his/her preferences or based on the type of path on which he/she is driving (for example, country roads, city roads, motorway, track, parking lot, traffic, etc.). This changed configuration is stored in the storing unit 4 and is re-used every time that same driver DR approaches the vehicle 1 in order to get on board (or every time the vehicle 1 driven by that same driver DR is driving along a path of that type).

Advantageously, though not necessarily, each block described so far represents a possible embodiment which is independent of the other blocks.

Advantageously, though not necessarily, the vehicle 1 is configured to carry out the method disclosed so far.

Even though the invention described above relates to a specific embodiment example, it should not be considered as limited to said embodiment example, for its scope of protection also includes all those variants, changes or simplifications covered by the appended claims, such as, for instance, a different type of interface, a different driver detection method, a different type of vehicle (for example, a two-wheel vehicle or a front-drive vehicle), different ergonomic data, a different type of actuator systems or models M, a different compensating method etc.

The invention offers many advantages.

First of all, the method and the vehicle described above avoid having to manually re-adjust, with every driver change, all the movable elements of the cockpit.

Furthermore, in case of less experienced drivers, drivers are allowed to assume an ergonomic position, which, otherwise, they would not be able to reach and set.

A further advantage of the invention lies in the possibility of processing a detailed model of the driver, avoiding rough approximations, which, instead, are necessary in the calculation of the ergonomic position starting from the sole height.

Furthermore, the invention makes it easier for the driver to get on board the vehicle, allowing him/her to autonomously reach, in a few seconds, the optimal configuration based on the data detected or previously stored.

In addition, the adjustment starting from the ankle of the driver allows drivers with extremely different physical features to have comparable reaction times and comfort.

LIST OF THE REFERENCE NUMBERS OF THE FIGURES 1 vehicle
2 passenger compartment
3 storing unit
4 processing unit
5 cockpit
6 actuator system
7 actuator system
8 seat cushion
9 actuator system
10 actuator system
11 actuator system
12 backrest
13 actuator system
14 actuator system
15 sensor device
16 camera
17 pillar
18 control panel
19 foot
20 tibia
21 torso
22 thigh
23 arm
24 forearm
25 portions on the outside of the work space
26 block
27 block
28 block
29 block
30 block
31 block
32 block
33 block
34 block
35 block
36 block
37 block
38 block
39 block
40 block
A40 angle
A42 angle
A44 angle
A46 angle
A47 angle
A57 angle
AO horizontal axis
AV vertical axis
DR driver
DS detection space
EL elbow
EP ergonomic position
FS foot sole
FT foot tip
H hip
h height
HA ankle
HE ears
HL heel
HN hand
KN knee
M model
O eyes
OC optimal configuration
OD direction
RM rear-view mirror
S seat
SH shoulder
SH' shoulder support point
SW steering wheel
T ground
VD direction
VDS distance from the vehicle
VS' ground visibility
VS" control panel visibility
WR wrist
WS work space
α angle
β angle
γ angle
δ angle
υ angle

The invention claimed is:

1. A method for the automatic adjustment of a cockpit (5) inside a road vehicle (1) driven by a driver (DR); the method comprises:

determining anthropometric data specific to the driver (DR) via at least one sensor device comprising a camera, wherein the camera is configured on the road vehicle to capture an entire image of the driver;

processing, based on the anthropometric data, an ergonomic position (EP) of a model (M) of the driver (DR) sitting on board the road vehicle (1);

processing, based on the ergonomic position (EP) of the model (M), an optimal configuration of the cockpit (5) so that, in use, the driver (DR) is in the ergonomic position (EP) determined by model (M);

operating a plurality of actuator systems (6, 7, 9-11, 13-15) to adjust a plurality of movable elements of the cockpit (5) and cause the cockpit (5) to reach the optimal configuration (OC);

wherein the anthropometric data includes at least one three-dimensional skeletal model of the driver (DR) generated by the camera, the skeletal model comprising joint positions and limb lengths of the driver, wherein the ergonomic position (EP) is determined by calculating a plurality of comfort angles associated with the driver's joint positions, including at least an ankle angle, a hip angle, and an elbow angle, and comparing the calculated comfort angles to predefined ergonomic thresholds, wherein the optimal configuration (OC) of the cockpit (5) is determined by associating the ergonomic position (EP) with predefined visibility parameters including a minimum ground visibility (VS');

a minimum visibility (VS") of a control panel (18) fitted on board a dashboard of the road vehicle (1); and wherein the plurality of actuator systems are configured to adjust at least a seat height, seat tilt, steering wheel position, and rear-view mirror orientation based on the optimal configuration (OC).

2. The method according to claim 1, wherein the optimal configuration of the cockpit (5) is processed by also associating a respective predefined value with a second comfort angle (A42); the second comfort angle (A42) being an angle of a hip (H) of the driver (DR) sitting on a driver's seat(S) of the road vehicle (1) based on the anthropometric data of the driver (DR) captured by the camera and included in the three-dimensional skeletal model.

3. The method according to claim 1, wherein the optimal configuration (OC) of the cockpit (5) is processed by also associating a respective predefined value with a third comfort angle (γ); the third comfort angle (γ) being an angle of an elbow (EL) of the driver (DR) having hands (HN) on a steering wheel (SW) of the road vehicle (1) based on the anthropometric data of the driver (DR) captured by the camera and included in the three-dimensional skeletal model.

4. The method according to claim 1, wherein the optimal configuration (OC) takes into account vehicle variables comprising a racing or a road attitude, an open or a closed hardtop, and/or visibility or weather conditions.

5. The method according to claim 1, wherein the anthropometric data of the driver (DR) comprises the ergonomic position of a plurality of joints of the driver (DR), through which at least a height (h) and a length of limbs of the driver (DR) are processed including positions of said body joints in the ergonomic position (EP) of the model (M).

6. The method according to claim 5, wherein the positions of said body joints of the driver (DR) are used to process the ergonomic position (EP) of the model (M), calculating angles associated with the body joints of the model (M) in the ergonomic position (EP).

7. The method according to claim 1, wherein the ergonomic position (EP) of the model (M) is processed considering a postural variation of a cervical articulation and/or a postural variation of an articulation of the shoulders.

8. The method according to claim 1, further comprising a control step comprising checking whether the optimal configuration (OC) lies within a work space (WS) of said plurality of movable elements of the cockpit (5) and determining possible portions (25) lying on an outside of the work space (WS); wherein for portions (25) lying on the outside of the work space (WS), the method further comprises a step of calculating an obtainable position processed based on a position of a point of the joint of the hip (H) of the driver (DR), and a consequent step of changing the ergonomic position (EP) of the model (M); wherein the obtainable position is calculated keeping a position of a joint of a knee (KN) of the driver (DR) constant.

9. The method according to claim 1, wherein said plurality of actuator systems (6, 7, 9-11, 13-15) to reach the optimal configuration (OC) comprises a height and depth adjustment of a seat cushion (8) of a seat of the driver (DR) and/or a tilt and thickness adjustment of a backrest (12) of the seat of the driver (DR) and/or an adjustment of one or more rear-view mirrors of the road vehicle (1) and/or a vertical and horizontal adjustment of a steering wheel.

10. The method according to claim 1, further comprising detecting the anthropometric data of the driver (DR) by means of a fixed or movable interface device, in which the driver manually enters said required anthropometric data to supplement the three-dimensional skeletal model.

11. The method according to claim 1, wherein the camera (16) faces an inside and/or an outside of the road vehicle (1).

12. The method according to claim 11, wherein the camera (16) is aimed at the outside of the vehicle (1) and is fitted on a pillar (17) on a driver's side of the road vehicle (1); wherein the camera detects the anthropometric data of the driver (DR) approaching the road vehicle (1) and processes the optimal configuration.

13. The method according to claim 1, further comprising dynamically adjusting the optimal configuration (OC) while driving; wherein dynamically adjusting comprises cyclically monitoring at least one parameter concerning a current condition of the driver (DR) or a current condition of the vehicle, and dynamically re-processing the ergonomic position (EP) of the driver (DR) based on the at least one parameter concerning the current condition of the driver (DR); wherein following the re-processing of the ergonomic position (EP) of the driver, the optimal configuration (OC) of said plurality of actuator systems is re-processed and controlled.

14. The method according to claim 1, further comprising a getting-in step, during which the plurality of actuator systems (6, 7, 9-11, 13-15) are controlled to cause the cockpit (5) to assume a retracted configuration, in which at least some of the movable elements of the cockpit (5) make it easier for the driver (DR) to get into the road vehicle; wherein following the getting-in step, with the driver on board the vehicle (1), the actuator systems (6, 7, 9-11, 13-15) adjust said at least some movable elements of the cockpit (5) to reach the optimal configuration (OC).

15. A road vehicle (1) comprising:
a storing unit (3) configured to store anthropometric data of a driver (DR);
a data processing unit (4) configured to process or receive, based on the anthropometric data, an ergonomic position (EP) of a model (M) of the driver (DR) sitting on board the road vehicle (1); the data processing unit (4) being further configured to process or receive, based on the ergonomic position (EP) of the model (M), an optimal configuration (OC) of a cockpit (5) so that, in use, the driver (DR) substantially is in the ergonomic position (EP);

a plurality of actuator systems (6, 7, 9-11, 13-15) configured to adjust a plurality of movable elements of the cockpit (5) and provide the optimal configuration (OC); and the road vehicle (1) being configured to carry out the method according to claim 1.

16. The vehicle (1) according to claim 15, further comprising a driver's seat (DR) and a first actuator system (6) comprising a linear actuator system configured to adjust a translation of the driver's seat (DR) in a direction that it parallel to a longitudinal axis of the vehicle (1); a second actuator system (7) comprising a rotary actuator system configured to adjust a height of a seating cushion (8) of the driver's seat (DR); a third actuator system (9) configured to adjust a tilt of the seating cushion (8) of the driver's seat (DR); a fourth (10) and a fifth (11) actuator system configured to adjust a tilt and a thickness of a backrest (12) of the driver's seat (DR) respectively; a sixth (13) and/or a seventh (14) actuator system, which are configured to vertically and horizontally adjust a position of a steering wheel inside the road vehicle (1) respectively; and at least one additional actuator system configured to adjust mirrors depending on the anthropometric data of the driver (DR) and the optimal configuration.

17. The vehicle (1) according to claim 16, further comprising a first sensor device (15) is fitted on a pillar (17) on a driver's side of the road vehicle (1) configured to detect the anthropometric data of the driver (DR) approaching the road vehicle (1); at least one second sensor device (15) fitted inside the vehicle (1) configured to detect an eye position of the driver (DR) to provide the data processing unit (4) with a feedback on correctness of the optimal configuration (OC) based on the visibility parameters.

* * * * *